US008090842B2

(12) United States Patent
Schirar et al.

(10) Patent No.: US 8,090,842 B2
(45) Date of Patent: Jan. 3, 2012

(54) METHOD OF INTERACTION WITH PHYSICAL ELEMENTS FORMING THE CONTENT OF A MACHINE

(75) Inventors: Stéphane Schirar, La Bouilladisse (FR); Jean-Sébastien Paris, La Bouilladisse (FR)

(73) Assignee: Gemalto SA, Meudon (FR)

( * ) Notice: Subject to any disclaimer, the term of this patent is extended or adjusted under 35 U.S.C. 154(b) by 0 days.

(21) Appl. No.: 12/666,659

(22) PCT Filed: Jun. 27, 2008

(86) PCT No.: PCT/EP2008/058265

§ 371 (c)(1),
(2), (4) Date: Jul. 6, 2010

(87) PCT Pub. No.: WO2009/000910

PCT Pub. Date: Dec. 31, 2008

(65) Prior Publication Data

US 2010/0274904 A1 Oct. 28, 2010

(30) Foreign Application Priority Data

Jun. 28, 2007 (EP) .................................... 07301169

(51) Int. Cl.
*G06F 15/16* (2006.01)
*H04B 7/00* (2006.01)

(52) U.S. Cl. ....................... 709/227; 455/41.1; 455/41.2

(58) Field of Classification Search .................. 709/227; 455/41.1, 41.2
See application file for complete search history.

(56) References Cited

U.S. PATENT DOCUMENTS

| | | | | |
|---|---|---|---|---|
| 7,269,732 | B2 * | 9/2007 | Kilian-Kehr | 713/172 |
| 7,620,386 | B2 * | 11/2009 | Wood, III | 455/411 |
| 7,693,549 | B2 * | 4/2010 | Gallagher | 455/558 |
| 7,724,137 | B2 * | 5/2010 | Page | 340/572.1 |
| 7,849,198 | B2 * | 12/2010 | Olgaard et al. | 709/227 |
| 7,905,419 | B2 * | 3/2011 | Charrat | 235/492 |
| 8,016,203 | B2 * | 9/2011 | Chamley et al. | 235/492 |
| 2003/0014179 | A1 | 1/2003 | Szukala et al. | |
| 2003/0110272 | A1 * | 6/2003 | du Castel et al. | 709/229 |
| 2003/0150915 | A1 * | 8/2003 | Reece | 235/449 |
| 2004/0034448 | A1 | 2/2004 | Siegers | |
| 2004/0250066 | A1 * | 12/2004 | Di Luoffo et al. | 713/168 |

(Continued)

FOREIGN PATENT DOCUMENTS

WO WO 01/20844 A 3/2001

OTHER PUBLICATIONS

International Search Report (PCT/ISA/210) for PCT/EP2008/058265 mailed Oct. 9, 2008.

(Continued)

*Primary Examiner* — Alina N. Boutah
(74) *Attorney, Agent, or Firm* — Buchanan Ingersoll & Rooney PC

(57) ABSTRACT

The invention concerns a method for interacting between a handheld device and a machine. The handheld device has an Internet browser for interacting with a physical element that is part of the machine. The physical element is a smart card web server for establishing a near-field wireless connection with the handheld device when the handheld device is in proximity of the machine. The physical element communicates over the air with at least a distant server, the server being able to update the content of the physical element.

10 Claims, 3 Drawing Sheets

U.S. PATENT DOCUMENTS

| | | | | |
|---|---|---|---|---|
| 2005/0009563 | A1* | 1/2005 | Stenmark | 455/558 |
| 2005/0181875 | A1* | 8/2005 | Hoehne et al. | 463/41 |
| 2006/0079284 | A1* | 4/2006 | Lu et al. | 455/558 |
| 2006/0294023 | A1* | 12/2006 | Lu | 705/67 |
| 2007/0249331 | A1* | 10/2007 | Sinivaara et al. | 455/418 |
| 2008/0263363 | A1* | 10/2008 | Jueneman et al. | 713/184 |
| 2009/0088077 | A1* | 4/2009 | Brown et al. | 455/41.2 |
| 2009/0300186 | A1* | 12/2009 | Haugli et al. | 709/227 |
| 2011/0202465 | A1* | 8/2011 | Mashhour | 705/67 |

OTHER PUBLICATIONS

Written Opinion (PCT/ISA/237) for PCT/EP2008/058265 mailed Oct. 9, 2008.

European Search Report for EP07301169.4 mailed Oct. 30, 2007.

Open Mobile Alliance: "OMA-AD/Smartcard_Web_Server-V1_0-20070209-C", Smartcard Web Server Enabler Architecture, Feb. 9, 2007, pp. 1-17.

* cited by examiner

METHOD OF INTERACTION WITH PHYSICAL ELEMENTS FORMING THE CONTENT OF A MACHINE

FIELD OF THE INVENTION

The invention relates to interactions with physical elements forming the content of a machine. More particularly, the invention relates to a method and a device to allow an end-user to have an efficient and interactive interface with a machine.

In such a context, a machine is for example a boiler, also called a heating apparatus, or any other home automation device like a wash machine. It can also be any machine with dedicated hardware, such as vending machine delivering drinks or junk food, ticket delivering machine to acquire tickets for train, plane, and boat, cash dispenser to obtain cash as example in the street, a complete car or part of the car itself. Such machines need some interaction with an end-user asking for a service (soft drink purchase as example) or with a maintenance worker performing a maintenance operation onto at least part of the machine.

Indeed, there is a need for easing the end-user experience when interfacing with machines. Currently, as a matter of an example, there are already hard coded dedicated man-to-machine interfaces on vending machines, but they are currently providing low level services LED—light emitting diode—screen with one or two rows, with limited set of characters, no colour, or even only dedicated mechanical buttons or even sometimes no interface at all.

BACKGROUND OF THE INVENTION

Some machines today offer the possibility, in order to access internal parameters of the machine, and to build a diagnostic, to plug a dedicated test tool on it or even a personal computer with embedded dedicated software.

Nevertheless, the end-user has to deal with small MMI (man to machine interface) and cannot use for example the last version of a technical manual available for the machine he's working on but only a manual user's guide made of paper or the very first version of the rudimentary notice stored into the machine when it was build.

User guides today mostly exist on a book format and can be lost and updated versions may not be available except after printing a new maintenance book.

More generally, such above already disclosed solutions provide a way to have a maintenance guide but they are expensive and not very upgradeable.

And last but not least, mobility is missing in such solutions, taking into account the fact that maintenance workers are traveling a lot in order to work on sites where machines are implemented.

So there is still a need for an end-user of a machine and for a maintenance worker as well to be able to have an efficient, interactive and flexible man to machine interface. A need exists for a solution that would be compliant with available machines, flexible and as cheap as possible, mainly based on existing infrastructures.

BRIEF SUMMARY

It is thus desirable to provide a method of interaction with physical elements forming the content of a machine on which would fulfill such needs. This purpose is achieved by way of the invention as recited in the appended claims.

DETAILED DESCRIPTION

In the presently described method, an end-user uses his classical mobile phone 20, 30, 10 equipped with a web-browser (as example a WAP for Wireless Application Protocol or xHTML for Extensible HTML, HTML being Hyper-Text Markup Language like) providing him, thanks to the disclosed invention, an easy access to a set of services broadcasted by a machine 60, 61 equipped with a communicating system 70, 71. The disclosed method comprises at least an interactive page display on the screen of the end-user's handheld device 20, 30, said interactive page displaying a state of the physical elements forming the content of the machine. This interactive page display on the screen of the handheld device comprises a near-field wireless connection establishment step 300, 400 between the machine and the handheld device for displaying the interactive page displaying the state of the physical elements forming the content of the machine on the handheld device. Thanks to this display, the end-user is then able to make a physical interaction with at least one of the physical elements forming the content of a machine.

In a preferred embodiment, such pages are distributed by a SCWS (Smart Card Web Server) embedded in a smart device part of the communicating system, being part of the machine itself. In a preferred embodiment, this smart part of the communicating system is a personal token, such as a Subscriber Identity Module, SIM, USIM (Universal Subscriber Identity Module), RUIM (Removable User Identity Module), depending on the telecommunication network used by the machine. The communicating system is indeed preferably equipped with a personal token in order to communicate with external world (allowing data provisioning Over The Air (OTA) for as example maintenance purposes: stocks, status, failure or for end-user's services provided by the vending machine such as advertising, loyalty programs).

The communicating system is also able to open a wireless connection (preferably in a peer to peer mode) with any handheld device entering in a communication field of the communication system. The said personal token of the communicating system of the machine is in one embodiment equipped with a smart card web server SCWS and is pre-loaded with the interactive pages which describe the service to be delivered. Such interactive pages can also be updated online on demand or even in a batch mode.

The end-user's handheld device then establishes the dedicated link to the communicating system through a wireless connection such as WiFi, bluetooth . . . , on the demand of a machine, as soon as the handheld device enters in the near field of the machine. The dedicated interactive pages will indeed then be exchanged on such a link. Some pages are stored into the machine, some others are broadcasted on the telecommunication network, from a server to the machine and then from the machine to the handled device of the end-user.

Those interactive pages could be of several types, such as, depending on the machine type:

- Pages allowing the access to an ordering/purchasing service (vending machines),
- Pages dedicated to loyalty programs available to some end-users,
- Pages allowing a direct access to a user's guide describing the use of a home electrical device such as a water heater, a washing machine, a heating apparatus (also called a boiler) or electronics parts of such a machine, or in automotive context, an engine in a car,
- Pages allowing an access to on machine's control and maintenance sections, Information pages on a company distributing the hardware of a machine, dedicated Advertisement space pages, pages allowing an easy and comfortable usage of a cash dispenser or of a ticket delivering machine, Pages customised for an end-user (for example loyalty programs), based on the said end-user's profile stored into a personal token of the handled device of the end-user, or even stored on a dedicated additional server, Pages organised to allow a technical worker to follow a maintenance process of the said machine.

Other purposes, benefits and aspects of the invention will appear through the following description, which is made in reference to the appended figures, among which:

Figure 1:
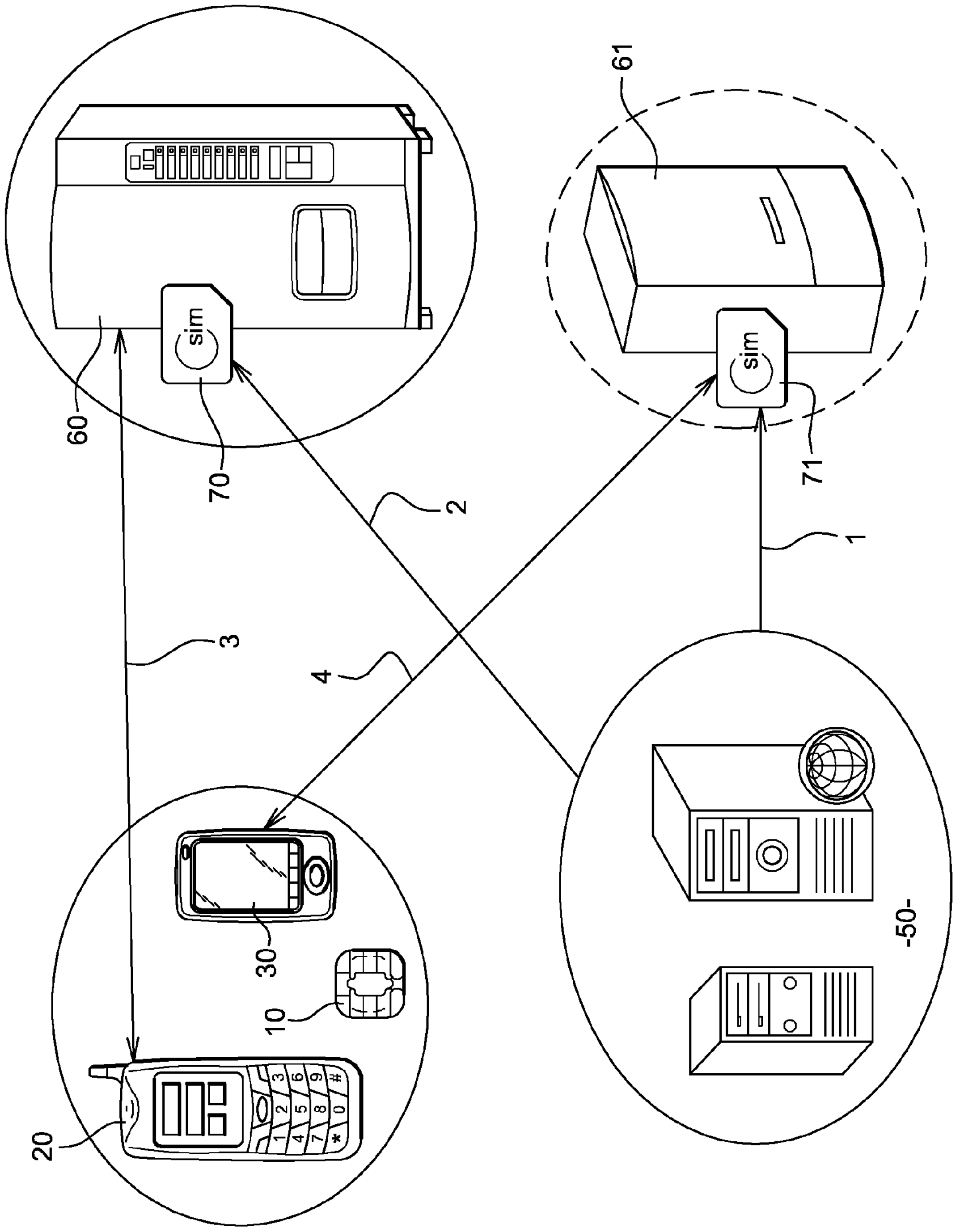
FIG. 1 represents the main blocks of an embodiment of the invention.

The system disclosed on FIG. 1 includes a content provider server 50 with associated content library, the content being as example any user's guide, advertisement, being stored as a document, video, photo, even voice, and music. The system also includes an end-user mobile phone 30, 20 preferably associated to a personal token 10. The smartphone 30, 20 is preferably equipped with a screen, but it can be any visualisation mean such as a tactile screen, a more classical phosphorescent surface on which an image is displayed, as on a television, computer monitor, or mobile handset.

The third part of the system is made of any machine available 60, 61, associated with a dedicated personal token 70, 71 usually physically linked to the said machine. The machine can be any machine such as vending machine delivering drinks or junk food, ticket delivering machine to acquire tickets for train, plane, and boat, cash dispenser to obtain cash as example in the street, a complete car or part of the car itself. The personal token 70, 71 needs only to be plugged to the machine. The machine can be any machine in the street, in a factory, or it can be part of the end-user material.

As disclosed in FIG. 1, the three sub-systems of the disclosed embodiment are interacting together.

The functional links between those entities are in one preferred embodiment based on several protocols bricks: the radio telecommunication network 1 and 2 between the personal token 70, 71 associated to the machine 60, 61 and the content manager server 50. A local wireless network 3,4 exists as well between the personal token 10 associated to a mobile phone 20,30, preferably a smart phone 30 and the personal token 70, 71 of the machine 60, 61. This local High Speed Protocol 3, 4 is in a preferred embodiment based on TCP/IP (Transmission Control Protocol/Internet Protocol). It's a local link using any protocol like as example IrDA (Infrared Digital Access), bluetooth, WiFi.

The communicating system 60, 70 and/or 61, 71 is here equipped with a personal token 70, 71 (as example a multimedia SIM card equipped with USB (Universal Serial Bus) capability and TCP/IP (Transmission Control Protocol/Internet Protocol) capability to communicate with external world (data provided for maintenance purposes: stocks, status, failures, . . . ). The personal token 70, 71 is able to open a wireless connection in a peer to peer mode with any device entering in the communication field. The personal token 70, 71 is in a preferred embodiment equipped with a SCWS (smart card web server) and it could be in a preferred embodiment also pre-loaded with the first level of xHTML pages which describe the service to be delivered.

The end-user's device 20, 30, 10 is preferably equipped with a rich media (xHTML compatible) browser able to read and display the pages received from the communicating system 60, 70 and/or 61, 71. The personal token 10 is not a mandatory feature but as it already usually exists, linked to the device 20, 30, it can be used to authenticate the end-user (for loyalty services as example) or the maintenance worker (proving the fact he made the asked intervention on the said machine 61).

More particularly, concerning the home automation use case, such data exchanges taking the form of interactive pages can deal as example about embedded maintenance and/or man to machine interface personalization or control. Thanks to the disclosed invention, personalized user interface (as example one for maintenance, one for repairs) are very easy to build.

Concerning the vending machine use case, exchanges 200, 300 can be related to available products and associated prices download for example.

Another advantage provided by the invention concerns the fact that there is no more dedicated screen needed on the machine as the screen of the end-user's mobile system 10, 20, 30 is used.

It is the same for the keyboard as the end-user's mobile system 10, 20, 30 has got a complete interface due to its classical usage. The machine maintenance is then eased thanks to this invention.

New services are available as well without any changes needed on the machine itself such as for example contactless payment solutions. Only the addition of dedicated new interactive pages is needed into the server 50.

As this solution provides online services to the vendor, OTA (Over The Air) updates are available.

Concerning particularly the user's guide example, a more home automation oriented application, the disclosed invention provides an easy way to always have updated embedded user guide/maintenance guide as well as embedded maintenance/control user interface in the memory of the personal token 70, 71. For the same reasons than in the previous use case, personalized user interface is available as well through the mobile phone, no dedicated screen and/or keyboard being needed anymore on the machine, such parts of a machine being very sensitive ones to physical damages.

In those embodiments, the invention allows:

The maintenance worker to be efficient in following an up to date tests suit in order to be able to maintain and/or repair the machine, the end-user to have a personalized, up to date man to machine interface, friendly way to activate a vending machine, with one interactive and flexible man-to-machine interface, vendors to organize push offer campaigns, and to manage online loyalty accounts.

The personal token 10 can be, depending of the network used by the end-user for its telecommunication service, a standardized card like USIM, SIM, and RUIM . . . .

The mobile handheld device 20 or 30 is as example a 2G or 3G mobile equipment, a PDA, a Windows CE™ handheld device.

The Wireless High Speed protocol Links 3 and 4 are preferably compliant with one of the following protocols: bluetooth, IrDA, WiMax 802.16m, WiBro, WiFi 802.11n, but it can be any other compatible local wireless Link.

The invention involves as well in one embodiment a dedicated application to provide an automatic management of the end-user's man to machine interface in his mobile phone, i.e. with the machine he's coming close to, and to automatically instruct the multimedia content transfer to the end-user's mobile system from the machine via interactive pages exchanges. According to one aspect of the invention, this application is an applet stored in the personal token 10 of the end-user's handheld system.

In a preferred embodiment, the application is a standalone application stored in the personal token which manages the end-user exchanges with the machine, dedicated to such a service. The application displays all the necessary information (such as advertisements, technical notice with diagrams, machine set up, interactive tests steps list, prices of available soft drinks, loyalty counter-value, promotional offers) on the screen of the end-user's mobile phone 20 or 30.

Figure 2:
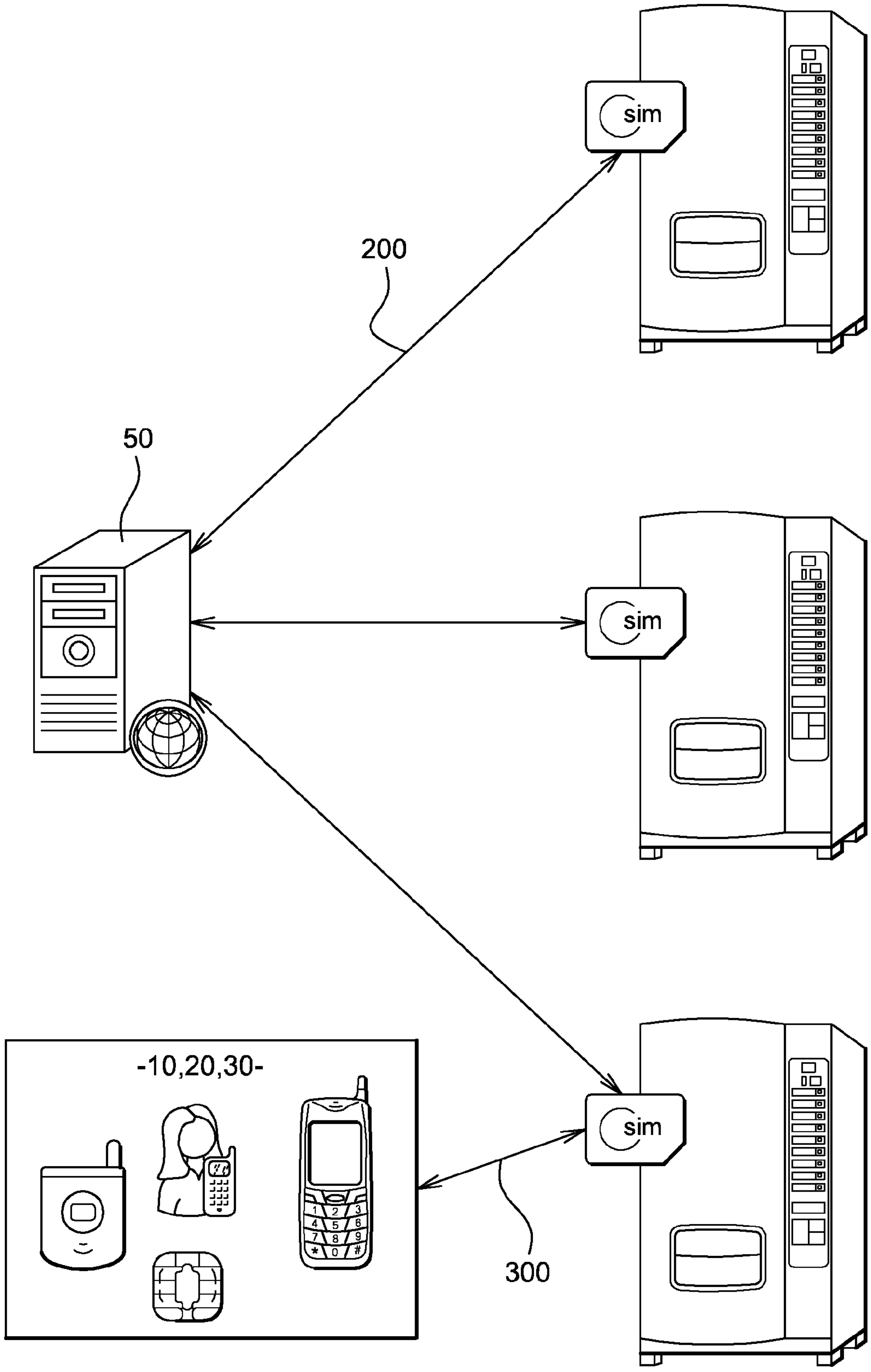
FIG. 2 is a flowchart showing a sequence of steps, according to one method in the system described in FIG. 1, when the end-user purchases a drink using a vending machine.
Figure 3:
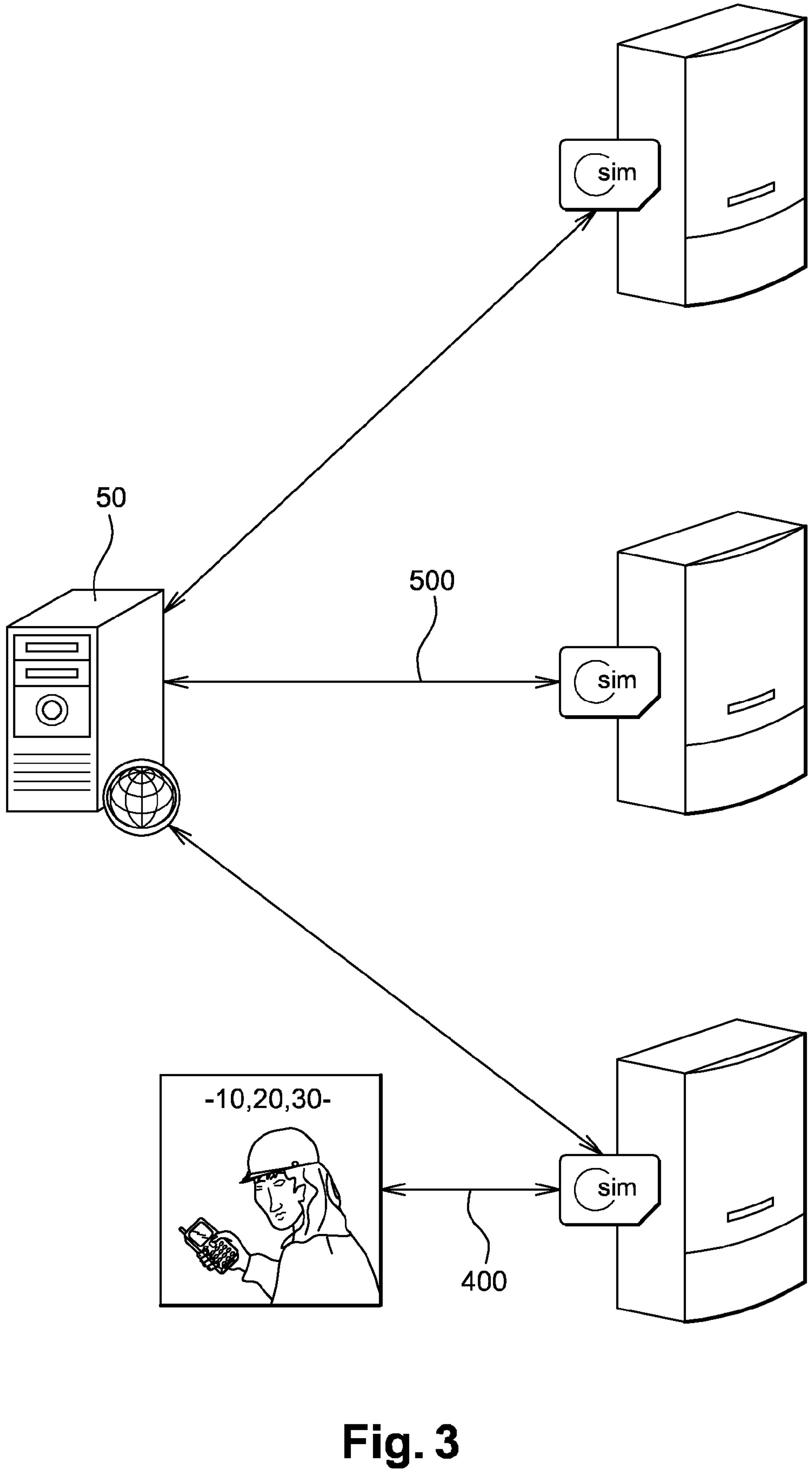
FIG. 3 is a flowchart showing a sequence of steps, according to one method in the system in FIG. 1, when the maintenance worker comes to fix up the machine or to make the maintenance of the said machine.

In one embodiment, referring to FIGS. 2 and 3, in order to get more in details, a particular implementation can be based on the usage of SIM toolkit standardized commands for the dedicated application.

There are several ways by which the said application can manage the service for the end-user such as using a mobile oriented web browser, using a smart card web server SCWS, using SMS exchanges with the server 50 . . . .

Another step can be added to the previously described process, i.e. an end-user authentication step and/or data encryption step in particular when dealing with some sensible machines being in a public area.

These different possible additional steps include, but are not limited to, usage of usual man to machine interface but used on the mobile terminal screen. They can be as well based on bitmap or icons usage, or even audio messages for blind people.

Hereafter, an embodiment of the invention will be described wherein the end-user is using a mobile handset, associated to a subscriber identity module, and connected via a mobile radio communication network such as GSM or 3G telecommunication network.

On the said personal token 10, in a dedicated memory such as a flash memory or EEPROM memory, the previously described dedicated application is stored. The application can be installed into the memory of the card during personalization step, before putting it on the market or installed using Over the Air (OTA) infrastructure. This dedicated application can be stored into the mobile terminal memory in another embodiment.

However, those skilled in the art should recognize that the method is applicable to other types of communication sessions between two devices operable either on the same network or different networks.

As described in FIG. 2, a first step 200 occurs when the end-user's device enters in the field of the communicating system 70 of the machine 60.

As soon as the end-user is near the machine 60, a wireless local connection 300 is established between the communicating system 60, 70 and the end-user's mobile system. Some interactive pages are then sent from the communicating system 60, 70 to the end-user's mobile system 10, 20, 30. Such pages are then displayed on the said mobile system. In this case some advertising profiled content can be added to the displayed interactive pages 200. The profiles content is, in this embodiment, a content which is adapted depending on some profile data stored in the personal token. The profile data define some specificities of the profile of the end-user, such as age, profession, family status, personal particular tastes. Upon end-user's actions, scrolling on pages and selecting menus options, some updates can be downloaded Over The Air (OTA) from the server 50 to the communicating system 60, 70. Such data can be downloaded as well during the night as example when OTA network is idle as example in order to update the drinks prices, or data can be uploaded to the server 50 from the communicating system 60, 70 (stocks updates, maintenance parameters backup, . . . ).

In reference to FIG. 3, a maintenance oriented embodiment will now be described for a maintenance worker entering, at step 400, with his mobile system 30, 10 in the field of a boiler equipped with a personal token 71. Only the content and the purpose of the interactive exchanged pages is different from the previous exposed embodiment, as in this last case the idea is to be able to make a diagnostic of the machine or to maintain it whereas in the first example the purpose is to provide an up to date MMI to the end-user who wants to buy (or rent) a service or a drink as example. In both cases, a physical interaction between the end-user and internal physical elements of the machine, either drinks bottles or mechanical elements to be maintained in the machine. Such physical interaction may also be a setting of internal parameters, inducing mechanical behaviour of elements of the machine. In the home automation example, an additional benefit may consist in some maintenance parameters be uploaded to the server 50 and last version of the page 39 of the user guide be downloaded as the technical expert is trying to repair the corresponding part of the machine.

Once the end-user is near from the machine 60, 70 (or 61, 71 for FIG. 2 or 3 respectively), the communicating system 60, 70 (or 61, 71) initiates a wireless session with the end-user's device 20, 10 (or 30, 10). Once the session is established, the SCWS (Smart card Web Server) of the personal token 70 (or 71) delivers the homepage to the end-user's device browser.

The end-user is then able to navigate through the pages and the several presented menus.

This personal token 10 is associated and/or inserted in a compatible smartphone 20, 30. The smartphones 20, 30 are any mobile terminals connected to mobile telecommunication standardised network and allow emission and reception of data such as Short Messages Services (SMS) that can carry either text or binary data. Such data messages are intended to the personal token 10, called Subscriber Identity Module (SIM) on GSM network.

The personal token 10 is in an embodiment previously loaded with a dedicated Java Application in a mobile handheld device 20, 30. This dedicated application allows the end-user, by comprehensive menus, to manage his multimedia Library and it'll be used as well in the next step to command to play the owned Multimedia items.

Obviously, an enrolment to the service is made before, using over the air data exchanges or when the end-user visits a point of sale offering such service.

Advantageously, in a preferred embodiment, the implementation of this invention is based on SCWS, which will be stored into the communicating device in the machine, so that the pages will be delivered and displayed to the end-user device.

According to some embodiments of the method, all the exchanges can be displayed to the end-user or, in a preferred embodiment, only relevant views are displayed to the end-user.

The dedicated application (not shown) is preferably stored on the personal token, more specifically in the subscriber identity module memory.

According to one embodiment, the subscriber identity module can also be a piece of software, the dedicated said application being in this case also a piece of software.

According to another embodiment, a new dedicated SIM toolkit application is stored in the subscriber identity module memory for implementing the method that is above described and the display of content is made using the MMI (Man Machine Interface) of the mobile terminal. Such an application is also known as an applet, or more specifically a cardlet, when implemented on a Java™ card type of subscriber identity module. Hereafter, this application will be referred to as an agent application. The subscriber identity module processor executes this agent application.

As another example, although the mobile terminal 20 or 30 and the personal token 10 are shown and described to be linked devices, it should not be construed to be limited as such. They can be as example two separate devices communicating using contactless channels such as infrared IrDA or ISO 14443.

The mobile terminal 20 or 30 and the personal token 10 may operate on networks including a public switched telephone network (PSTN), a mobile communication network, an Internet protocol (IP) network, etc. The described communication sessions may be voice or data communication sessions. Examples of data communication sessions include, but are not limited to, audio streaming, video streaming, video conferencing, Voice over IP (VoIP) etc.

The disclosed invention allows having a very easy to use and convenient way to display updated content on the interface without the need to explicitly ask for a new version of the said content.

The present embodiment of the invention can be implemented on all the mobile systems available on the market in the same way, with the same end-user experience. It is indeed portable and can be used on all handsets, whatever its brand and model, due to the fact that the application is preferably implemented inside the personal token associated with any mobile terminal.

The disclosed embodiment is basically well adapted to multimedia content but it can also be applied to other kinds of data such as advertisement, user's guides, music, photos, video or any kind of multimedia data.

With the proposed solution, it is not necessary to provide any user interface on the machine, as it is provided directly on the handset so there is no heavy interface maintenance cost.

A personalized welcome view for the end-user through a hand check protocol between the mobile and communicating machine is advantageously provided as well. The welcome screen can be customized depending as an example on the time of the day, on a local weather forecast, or even on end-user profile data as stored in the personal token 10 of the said end-user.

Stored pages can be easily updated Over the Air (OTA) and personalised depending on the end-user preferences.

Concerning the end-user interfaces, with the disclosed invention, there is no more a need for:

- dedicated man to machine static and hard-coded interface on the machine, inducing vandalism risk,
- Buttons (meaning no more maintenance fees because of mechanical problems),
- LED screens (with drastically reduced number of characters per line),
- Embedded computer or equivalent, such computer being quite expensive equipments. Concerning the machine maintenance service, with the disclosed invention there is no need anymore for dedicated interface or connectors that would allow the maintenance worker to plug a PC (Personal Computer) in order to access the data on the device,

- Paper or CDROM containing user's guides. All changes can be made online. No need anymore to store big amount of paper or electronic data locally, only the necessary up to date parts of the user's guide are downloaded on demand.

One other important point is the language, pages being deployed directly and only in the relevant language adapted to the end-user preferences. Concerning more particularly the user's guide classically printed in several languages, thanks to the disclosed invention, only the version of the preferred language is available, saving consequently lots of paper.

The invention claimed is:

1. A system for interacting between a handheld device and a machine, the system comprising:
- the handheld device;
- the machine;
- a smart device linked to the machine, the smart device comprising a smart card web server, wherein the smart device is a SIM, USIM or RUIM card;
- the handheld device comprising a web browser for interacting with the smart card web server;
- wherein the smart device is able to open a wireless connection with the handheld device in response to determining that the handheld device is close to the machine; and
- wherein the smart card web server is able to deliver, through the open wireless connection, to the browser at least one page.

2. The system according to claim 1, wherein the smart device is a personal token.

3. The system according to claim 1, wherein the smart device is pre-loaded with interactive pages which describe a service to be delivered.

4. The system according to claim 2, wherein the personal token is pre-loaded with interactive pages which describe a service to be delivered.

5. The system according to claim 1, wherein the smart device is pre-loaded with interactive pages which describe a service to be delivered.

6. The system according to claim 1, wherein the smart device is configured to communicate over the air with at least one distant server, said at least one distant server being able to update a content of the smart device.

7. The system according to claim 2, wherein the personal token is configured to communicate over the air with at least one distant server, said at least one distant server being able to update a content of the personal token.

8. The system according to claim 1, wherein the smart device is configured to communicate over the air with at least one distant server, said at least one distant server being able to update a content of the smart device.

9. The system according to claim 3, wherein the smart device is configured to communicate over the air with at least one distant server, said at least one distant server being able to update a content of the smart device.

10. A method for interacting between a handheld device and a machine, the method comprising:
- providing a smart device to the machine, the smart device comprising a smart card web server, wherein the smart device is a SIM, USIM or RUIM card;
- wherein the handheld device comprises a web browser for interacting with the smart card web server;
- opening, by the smart device, a wireless connection with the handheld device in response to determining that the handheld device is close to the machine; and
- delivering, by the smart card web server, via the wireless connection, at least one page to the browser.

* * * * *